United States Patent
Wu et al.

(10) Patent No.: US 11,343,855 B2
(45) Date of Patent: May 24, 2022

(54) METHOD AND DEVICE FOR RANDOM ACCESS AND TERMINAL

(71) Applicant: VIVO MOBILE COMMUNICATION CO., LTD., Guangdong (CN)

(72) Inventors: Yumin Wu, Chang'an Dongguan (CN); Li Chen, Chang'an Dongguan (CN); Xueming Pan, Chang'an Dongguan (CN); Xiaodong Yang, Chang'an Dongguan (CN); Yue Ma, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 108 days.

(21) Appl. No.: 16/652,062

(22) PCT Filed: Oct. 11, 2018

(86) PCT No.: PCT/CN2018/109804
§ 371 (c)(1),
(2) Date: Mar. 29, 2020

(87) PCT Pub. No.: WO2019/076229
PCT Pub. Date: Apr. 25, 2019

(65) Prior Publication Data
US 2020/0252971 A1    Aug. 6, 2020

(30) Foreign Application Priority Data
Oct. 20, 2017  (CN) .......................... 201710998670.0

(51) Int. Cl.
*H04W 74/08*    (2009.01)

(52) U.S. Cl.
CPC .............................. *H04W 74/0833* (2013.01)

(58) Field of Classification Search
None
See application file for complete search history.

(56) References Cited

U.S. PATENT DOCUMENTS

| 10,999,870 | B2 * | 5/2021 | Ou ....................... H04W 74/008 |
| 2013/0195049 | A1 * | 8/2013 | Yang ..................... H04W 72/04 370/329 |

(Continued)

FOREIGN PATENT DOCUMENTS

| CN | 102548015 A | 7/2012 |
| CN | 103313419 A | 9/2013 |

(Continued)

OTHER PUBLICATIONS

CN Office Action in Application No. 201710998670.0 dated Mar. 5, 2021.

(Continued)

*Primary Examiner* — Ayaz R Sheikh
*Assistant Examiner* — Faiyazkhan Ghafoerkhan
(74) *Attorney, Agent, or Firm* — Maschoff Brennan (57) ABSTRACT

A method and a device for random access and a terminal are provided. The method includes: obtaining random access configuration information, where the random access configuration information includes a random access resource corresponding to each bandwidth part (BWP); and obtaining a target random access corresponding to a currently activated BWP for the terminal based on the random access configuration information, and initiating a random access procedure by using the target random access resource.

20 Claims, 5 Drawing Sheets

(56) References Cited

U.S. PATENT DOCUMENTS

| | | | | |
|---|---|---|---|---|
| 2015/0103761 A1* | 4/2015 | Chen | ................ | H04W 74/0833 370/329 |
| 2016/0309379 A1* | 10/2016 | Pelletier | ................ | H04W 76/12 |
| 2017/0196019 A1* | 7/2017 | Kim | .................... | H04W 74/002 |
| 2017/0231011 A1* | 8/2017 | Park | .................... | H04W 74/006 |
| 2018/0139778 A1* | 5/2018 | Chou | .................... | H04W 74/04 |
| 2019/0059112 A1* | 2/2019 | Ou | .................... | H04W 74/0833 |
| 2019/0090284 A1 | 3/2019 | Kang et al. | | |
| 2019/0104554 A1* | 4/2019 | Amuru | ................ | H04W 72/042 |
| 2021/0219347 A1* | 7/2021 | Ou | .................... | H04W 74/008 |

FOREIGN PATENT DOCUMENTS

| | | |
|---|---|---|
| CN | 104186022 A | 12/2014 |
| EP | 3 445 123 A1 | 2/2019 |
| WO | 2013/132327 A1 | 9/2013 |
| WO | 2017/179784 A1 | 10/2017 |

OTHER PUBLICATIONS

"Random access in NR", Motorola Mobility,3GPP TSG RAN WG1 Meeting #86bis, R1-1609918, Oct. 10, 2016.

"Discussion on remaining details on PRACH formats", 3GPP TSG RAN WG1 Meeting 90bis, R1-1718183, Oct. 9, 2017.

European Search Report in Application No. 1886790.8 dated Sep. 29, 2020.

"Motorola Mobility" 3GPP TSG RAN WG1 Meeting #86bis, Oct. 10, 2016.

"Discussion on remaining details on PRACH formats" 3GPP TSG RAN WG1 Meeting 90bis, Oct. 9, 2017.

"Remaining details on PRACH procedure" 3GPP TSG RAN WG1 Meeting 90bis, Oct. 9, 2017.

"Control plane impacts for Bandwidth Parts" 3GPP TSG-RAN WG2 Meeting #99bis, Oct. 9, 2017.

Written Opinion and International Search Report in Application No. PCT/CN2018/109804 dated Apr. 30, 2020.

* cited by examiner

METHOD AND DEVICE FOR RANDOM ACCESS AND TERMINAL

CROSS-REFERENCE TO RELATED APPLICATION

This application is the U.S. national phase of PCT Application No. PCT/CN2018/109804 filed on Oct. 11, 2018, which claims a priority to Chinese Patent Application No. 201710998670.0 filed on Oct. 20, 2017, both disclosures of which are incorporated in their entireties by reference herein.

TECHNICAL FIELD

The present disclosure relates to the field of communication technologies, and in particular to a method a device for random access (RA) and a terminal.

BACKGROUND

In a $5^{th}$ generation (5G) mobile communication system, a terminal may only support a relatively low operating bandwidth (such as 5 MHz), while a cell on a network side may support a relatively high bandwidth (such as 100 MHz). In the high bandwidth, the low bandwidth part on which the terminal operates is called a bandwidth part (BWP). From the perspective of terminal configuration, for different terminal functions, the BWP may be a BWP for a cell or under a cell.

The network side may configure one or more BWPs for a terminal, and switches the BWP on which the terminal can operate by deactivating the BWP or activating another BWP. Generally, the network side may configure a default BWP; in a case that the terminal operates on another BWP of the cell, the network side may configure the terminal with a timer operating on the other BWP of the cell; and when the timer expires, the terminal may switch to the default BWP.

The random access procedure is a necessary process for establishing a radio link between a terminal and a network side. Only after the random access is completed can data interoperation between the terminal and the network side be performed normally. The random access procedure is mainly divided into: non-contention based random access and contention based random access.

When the terminal operates on an activated BWP, a random access resource may not be configured for the BWP. In this case, if the terminal is to initiate a random access procedure, an initiation failure may occur, thereby reducing a success rate of communication between the terminal and the network side.

SUMMARY

In a first aspect, embodiments of the present disclosure provide a method for random access, which is applied to a user equipment (terminal) and includes:

obtaining random access configuration information, where the random access configuration information includes a random access resource corresponding to each bandwidth part (BWP);

obtaining a target random access resource corresponding to a currently activated BWP for the terminal based on the random access configuration information; and initiating a random access procedure by using the target random access resource.

In a second aspect, embodiments of the present disclosure further provide a method for random access, which is applied to a network side and includes:

completing a random access procedure of a terminal, according to the random access procedure initiated by the terminal based on a target random access resource;

where the target random access resource is a target random access resource that is corresponding to a currently activated BWP for the terminal and obtained by the terminal based on random access configuration information, and the random access configuration information includes a random access resource corresponding to each bandwidth part (BWP).

In a third aspect, embodiments of the present disclosure further provide a terminal, including:

a first obtaining module, configured to obtain random access configuration information, where the random access configuration information includes a random access resource corresponding to each bandwidth part (BWP);

a second obtaining module, configured to obtain a target random access resource corresponding to a currently activated BWP for the terminal based on the random access configuration information; and a first processing module, configured to initiate a random access procedure by using the target random access resource.

In a fourth aspect, embodiments of the present disclosure further provide a network side device, including: a processing module, configured to complete a random access procedure of a terminal, according to the random access procedure initiated by the terminal based on a target random access resource, where the target random access resource is a target random access resource that is corresponding to a currently activated BWP for the terminal and obtained by the terminal based on random access configuration information, and the random access configuration information includes a random access resource corresponding to each bandwidth part (BWP).

In a fifth aspect, embodiments of the present disclosure further provide a terminal, including: a memory, a processor, and a program stored on the memory and executable by the processor, when the program is executed by the processor, steps of the method for random access according to the first aspect are implemented.

In a sixth aspect, embodiments of the present disclosure further provide a network side device, including: a memory, a processor, and a program stored on the memory and executable by the processor, when the program is executed by the processor, steps of the method for random access according to the second aspect are implemented.

In a seventh aspect, embodiments of the present disclosure further provide a computer readable storage medium having a program stored thereon, when the program is executed by a processor, steps of the method for random access according to the first aspect or the second aspect are implemented.

BRIEF DESCRIPTION OF THE DRAWINGS

In order to illustrate technical solutions of embodiments of the present disclosure more clearly, the drawings used in the descriptions of the embodiments of the present disclosure are briefly introduced hereinafter. Apparently, the drawings in the following descriptions are merely some embodiments of the present disclosure. For those skilled in the art, other drawings can be obtained based on these drawings without any creative efforts.

DETAILED DESCRIPTION

The technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person ordinary skilled in the art based on the embodiments of the present disclosure without any creative efforts fall within the protection scope of the present disclosure. The term "and/or" represents at least one of connected objects.

Figure 1:
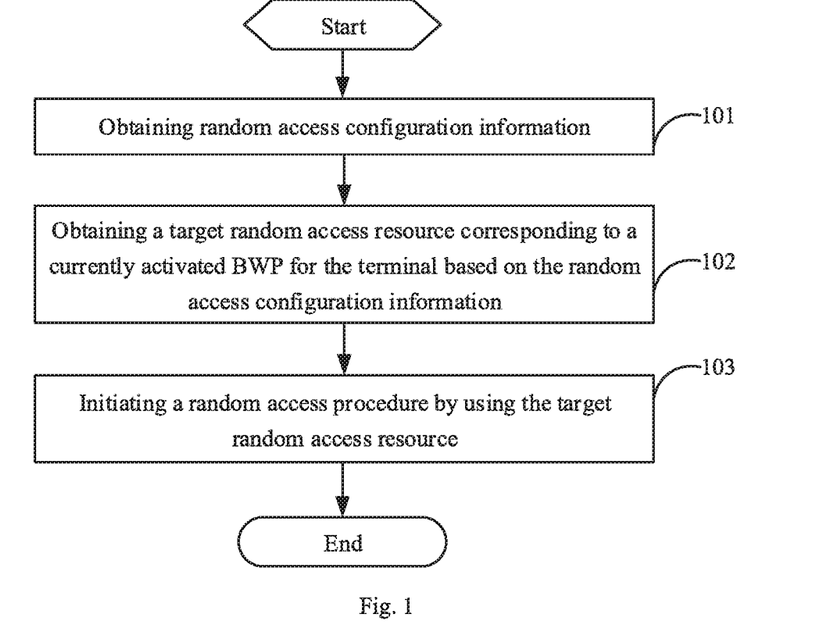
FIG. 1 is a flowchart of a method for random access according to embodiments of the present disclosure.

Referring to FIG. 1, FIG. 1 is a flowchart of a method for random access according to embodiments of the present disclosure. The method shown in FIG. 1 may be applied to a terminal. As shown in FIG. 1, the following steps 101 to 103 are included.

Step 101 includes obtaining random access configuration information. The random access configuration information includes a random access resource corresponding to each BWP.

In an embodiment of the present disclosure, the terminal may receive the random access configuration information transmitted by the network side, or obtain the predefined random access configuration information according to a pre-agreement with the network side.

The random access resources corresponding to each BWP may represent that: each BWP has a corresponding random access resource, where the BWPs and the random access resources may be in a one-to-one correspondence, or multiple BWPs may have the same random access resource.

In addition to the random access resources corresponding to each BWP, the random access configuration information may further include the following information:

(1) indication information for indicating whether the random access resource is used for a contention based random access;

(2) indication information for indicating whether the random access resource is used for a non-contention based random access; or (3) a bandwidth for the random access procedure.

The random access resource includes one or more pieces of the following information: time-domain resource configuration; frequency-domain resource configuration; coding resource configuration; or, space resource configuration.

Random access resources of different BWPs may be overlapped, or may not be overlapped, or may be partially overlapped. That is, the random access resources of different BWPs may be the same, or may be different; if they are the same, they may be partially the same. The overlapped or partially overlapped random access resources include one or more pieces of the following information: time-domain resource configuration; frequency-domain resource configuration; coding resource configuration; or, space resource configuration.

The time-domain resource configuration includes one or more pieces of the following information: a radio frame (e.g., a system frame number (SFN)); a subframe; or, a slot.

The frequency-domain resource configuration includes one or more pieces of the following information: a frequency point identity; a bandwidth (such as a minimum bandwidth of 5 MHz predefined in a technical specification); a BWP identity (such as an identity of a default BWP or an identity of a currently activated BWP); a physical resource block identity; a cell identity; or, a subcarrier spacing. Specifically, the BWP identity includes one or more of the following information: an identity of a default BWP; an identity of a currently activated BWP; or, an identity of a currently deactivated BWP.

The coding resource configuration includes: a random access preamble.

The space resource configuration includes one or more pieces of the following information: a reference signal identity; a synchronous signal block (SSB) identity; a channel state information-reference signal (CSI-RS) identity; a beam identity; a beam pair identity; a transmission node identity; a cell identity; or, a cell group identity.

The bandwidth for the random access procedure is applied in a process in which the terminal transmits a message to the network side in the random access procedure, and/or a process in which the terminal receives a message from the network side in the random access procedure.

It should be noted that the content of the foregoing information may be further expanded with the development of technology. In the embodiments of the present disclosure, examples are merely provided to describe the content that may be included in the foregoing information.

Step 102 includes obtaining a target random access resource corresponding to a currently activated BWP for the terminal according to the random access configuration information.

According to the above random access configuration information, the terminal may obtain a corresponding random access resource according to the currently activated BWP, which is referred to as the target random access resource herein.

Step 103 includes initiating a random access procedure by using the target random access resource.

According to different contents included in the random access configuration information, the terminal may initiate different types of random access procedures. As an example, when the indication information for indicating whether the random access resource is used for the contention based random access indicates that the random access resource is used for the contention based random access, the terminal may initiate a contention based random access procedure by using the target random access resource. When the indication information for indicating whether the random access resource is used for the non-contention based random access indicates that the random access resource is used for the non-contention based random access, the terminal may initiate a non-contention based random access procedure by using the target random access resource. As another example, when the BWP identity includes the identity of the default BWP, the terminal initiates a random access procedure on the default BWP by using the target random access resource.

In practical applications, a BWP corresponding to the target random access resource may not be a currently activated BWP for the terminal. Therefore, in order to further improve resource utilization, it may also be determined whether the currently activated BWP for the terminal is the BWP corresponding to the target random access resource. If the currently activated BWP for the terminal is not the BWP corresponding to the target random access resource, the BWP corresponding to the target random access resource is activated, and the random access procedure is initiated on the BWP corresponding to the target random access resource and by using the target random access resource. In addition, the terminal may deactivate the currently activated BWP for the terminal, inform the network side about information of the currently activated BWP for the terminal, and inform the network side about information of the BWP corresponding to the target random access resource. Then, after receiving the above information, the network side may transmit data to the terminal based on the BWP activated by the terminal.

In addition, after initiating the random access procedure, for messages that the terminal needs to transmit to the network side in the subsequent process between the terminal and the network side, the terminal transmits the messages, which need to be transmitted to the network side in the random access procedure, on the currently activated BWP for the terminal. If the currently activated BWP for the terminal is deactivated, the random access procedure is stopped. The types of the stopped random access procedure include a contention based random access procedure, or a non-contention based random access procedure, or, include both a contention based random access procedure and a non-contention based random access procedure.

In the embodiments of the present disclosure, when the terminal initiates the random access procedure, the target random access resource corresponding to the currently activated BWP can be obtained according to the random access configuration information, and the target random access resource is used to initiate the random access procedure. It can be seen that, in the embodiments of the present disclosure, it can be guaranteed that the terminal initiates the random access procedure by using the corresponding resource on the currently activated BWP, thereby avoiding the problem in the conventional technologies that a random access procedure failure is caused due to the fact that there may be no random access resource configured for an activated BWP on which a terminal operates. Therefore, based on the embodiments of the present disclosure, the success rate of communication between terminals and network sides can be improved.

Moreover, in an embodiment of the present disclosure, the terminal may determine whether to stop the corresponding random access procedure according to the type of the random access, thereby improving the success probability of the random access.

In an embodiment of the present disclosure, the above method may be applied to a terminal, such as a mobile phone, a tablet personal computer, a laptop computer, a personal digital assistant (PDA), a mobile Internet device (MID) or a wearable device.

Figure 2:
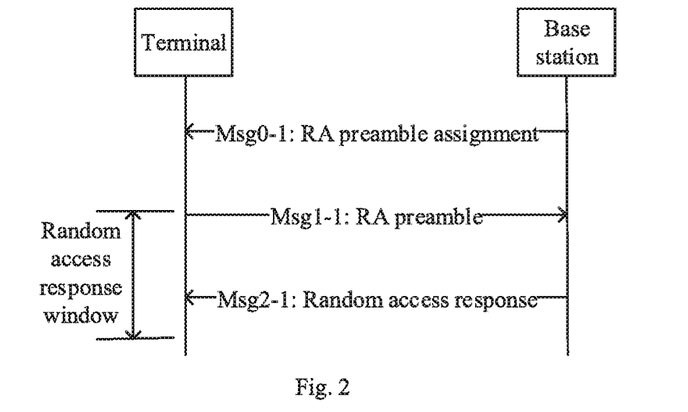
FIG. 2 is a flowchart of a method of a non-contention based random access procedure according to embodiments of the present disclosure.
Figure 3:
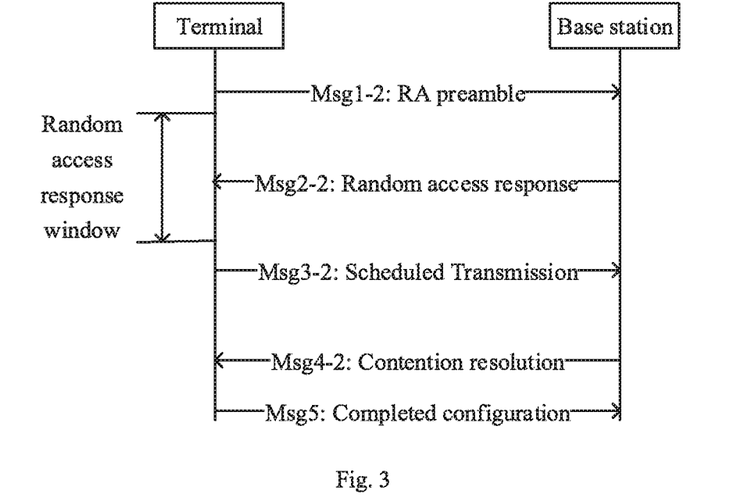
FIG. 3 is a flowchart of a method of a contention based random access procedure according to embodiments of the present disclosure.

The non-contention based random access procedure is shown in FIG. 2, and the contention based random access procedure is shown in FIG. 3. The network side may be a base station or the like.

As shown in FIG. 2, FIG. 2 is a schematic diagram of a non-contention based random access procedure, which is as follows.

Msg0-1: a base station transmits an RA preamble assignment to a terminal, to allocate a dedicated random access resource for the terminal for the non-contention based random access.

Msg1-1: the terminal transmits a designated dedicated random access signal to the base station on the designated random access resource according to the random access resource indicated by Msg0-1.

Specifically, the terminal transmits an RA preamble to the base station.

After transmitting Msg1-1, the terminal calculates identity information (i.e., random access radio network temporary identity (RA-RNTI)) of Msg2-1 to be scheduled by the network side according to the transmitting time and frequency location of Msg1-1. The calculation method is as follows:

$$\text{RA-RNTI}=1+t\_id+10*f\_id$$

where t_id is a subframe identity of the random access signal, and f_id is a frequency domain identity of the random access signal.

After transmitting Msg1-1, the terminal monitors a downlink channel in a fixed window (a random access response window (RAR window)), to obtain feedback information Msg2-1 of the network side, where the control channel is a physical downlink control channel (PDCCH), the data channel is a physical downlink shared channel (PDSCH), and the terminal may start a corresponding timer for the RAR window (for example, starting at a start moment of the RAR window and stopping at an end moment of the RAR window). The starting location of the RAR window is a subframe where Msg1-1 transmission ends plus 3 subframes, and a length of the RAR window is a length configured by the network.

Msg2-1: the base station transmits a random access response to the terminal. The random access response includes: Msg1-1 identity information (i.e., a random access preamble identifier (RAPID)); uplink timing advance information (for example, timing advance command); uplink transmission grant information (i.e., UL grant); backoff information (backoff indicator, BI); or temporary terminal identity information (i.e., temporary C-RNTI). If the terminal fails to receive the random access response (RAR), a moment when a random access is transmitted for a next time is determined according to the backoff information indicated in the RAR. The terminal needs to continuously monitor in the entire RAR window to receive the corresponding RAR message.

Reference is made to FIG. 3, and FIG. 3 is a schematic diagram of the contention based random access procedure, which is as follows.

Msg1-2: a terminal selects a random access resource and uses the random access resource to transmit a selected random access signal to a base station.

Specifically, the terminal transmits an RA preamble to the base station. The RA-RNTI and RAR windows are calculated in the same way as the non-contention based random access procedure.

Msg2-2: after receiving Msg1-2, the base station calculates a timing advance (TA) and transmits a random access response to the terminal. The random access response includes at least timing advance information (for example, TA) and UL grant for Msg3. The terminal needs to continuously monitor in the entire RAR window to receive the corresponding RAR message.

Msg3-2: the terminal transmits a scheduled transmission message to the base station. Specifically, the terminal transmits an uplink transmission on the UL grant designated by Msg2-2. The content of uplink transmission of Msg3-2 is different for different random access reasons. For example, for initial access, a radio resource control protocol (Radio Resource Control, RRC) connection establishment request is transmitted in Msg3-2.

Msg4-2: the base station transmits a contention resolution message to the terminal. The terminal may determine whether the random access is successful according to Msg4-2.

Msg5: the terminal may feed back a configuration completion message.

In the above processes, the terminal receives and transmits messages within a range of a bandwidth for the random access procedure included in the random access configuration information.

Figure 4:
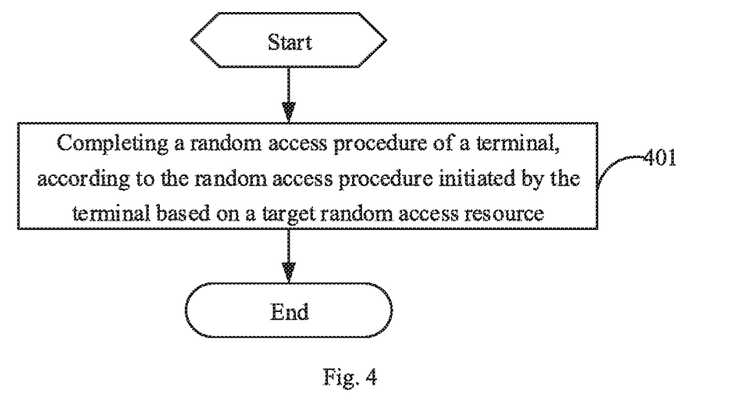
FIG. 4 is a flowchart of a method for random access according to embodiments of the present disclosure.

Referring to FIG. 4, FIG. 4 is a flowchart of a method for random access according to embodiments of the present disclosure, which is applied to a network side such as a base station. As shown in FIG. 4, the following steps are included.

Step 401 includes completing a random access procedure of a terminal according to the random access procedure initiated by the terminal using a target random access resource.

The target random access resource is a target random access resource that is corresponding to a currently activated BWP for the terminal and obtained by the terminal based on random access configuration information, and the random access configuration information includes a random access resource corresponding to each bandwidth part (BWP).

In addition to the random access resources corresponding to each BWP, the random access configuration information may further include the following information:

(1) indication information for indicating whether the random access resource is used for a contention based random access;

(2) indication information for indicating whether the random access resource is used for a non-contention based random access; or (3) a bandwidth for the random access procedure.

The random access resource includes one or more pieces of the following information: time-domain resource configuration; frequency-domain resource configuration; coding resource configuration; or, space resource configuration.

Random access resources of different BWPs may be overlapped, or may not be overlapped, or may be partially overlapped. That is, the random access resources of different BWPs may be the same, or may be different; if they are the same, they may be partially the same. The overlapped or partially overlapped random access resources include one or more pieces of the following information: time-domain resource configuration; frequency-domain resource configuration; coding resource configuration; or, space resource configuration.

The time-domain resource configuration includes one or more pieces of the following information: a radio frame (e.g., a system frame number (SFN)); a subframe; or, a slot.

The frequency-domain resource configuration includes one or more pieces of the following information: a frequency point identity; a bandwidth (such as a minimum bandwidth of 5 MHz agreed in a technical specification); a BWP identity (such as an identity of a default BWP or an identity of a currently activated BWP); a physical resource block identity; a cell identity; or, a subcarrier spacing. Specifically, the BWP identity includes one or more pieces of the following information: an identity of a default BWP; an identity of a currently activated BWP; or, an identity of a currently deactivated BWP.

The coding resource configuration includes: a random access preamble.

The space resource configuration includes one or more pieces of the following information: a reference signal identity; a synchronous signal block (SSB) identity; a channel state information-reference signal (CSI-RS) identity; a beam identity; a beam pair identity; a transmission node identity; a cell identity; or, a cell group identity.

The bandwidth for the random access procedure is applied in a process in which the terminal transmits a message to the network side in the random access procedure, and/or a process in which the terminal receives a message from the network side in the random access procedure.

It should be noted that the content of the foregoing information may be further expanded with the development of technology. In the embodiments of the present disclosure, examples are merely provided to describe the content that may be included in the foregoing information.

If the terminal initiates a contention based random access procedure by using the target random access resource, the network side completes the contention based random access procedure of the terminal according to the contention based random access procedure initiated by the terminal using the target random access resource. If the terminal initiates a non-contention based random access procedure by using the target random access resource, and the network side completes the non-contention based random access procedure of the terminal according to the non-contention based random access procedure initiated by the terminal using the target random access resource.

In addition, the network side may receive information of a BWP corresponding to the target random access resource, where the information of the BWP corresponding to the target random access resource is transmitted by the terminal in a case that the terminal determines that a currently activated BWP is not included in BWP(s) corresponding to the target random access resource, and/or receive information of the currently activated BWP, where the information of the currently activated BWP is transmitted by the terminal in a case that the terminal determines that the currently activated BWP is not included in the BWP(s) corresponding to the target random access resource. Therefore, the network side can determine the currently activated BWP for the terminal, and transmit data to the terminal on the currently activated BWP for the terminal, etc.

For specific implementations of the random access procedures, reference can be made to FIG. 2 and FIG. 3.

In the embodiments of the present disclosure, when the terminal initiates the random access procedure, the target random access resource corresponding to the currently activated BWP can be obtained according to the random access configuration information, and the target random access resource is used to initiate the random access procedure. It can be seen that, in the embodiments of the present disclosure, it can be guaranteed that the terminal initiates the random access procedure by using the corresponding resource on the currently activated BWP, thereby avoiding the problem in the conventional technologies that a random access procedure failure is caused due to the fact that there may be no random access resource configured for a activated BWP on which a terminal operates. Therefore, based on the embodiments of the present disclosure, the success rate of communication among terminals and network sides can be improved.

Figure 5:
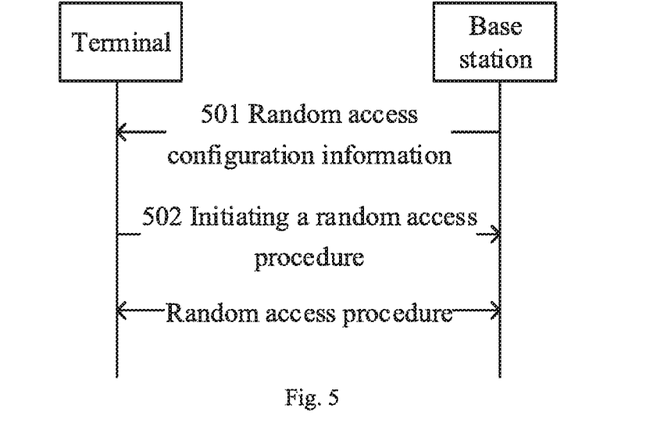
FIG. 5 is a flowchart of a method for random access according to embodiments of the present disclosure.

In a specific application, as shown in FIG. 5, a method for random access according to embodiments of the present disclosure includes steps 501 and 502.

Step 501 includes: configuring random access configuration(s) corresponding to one or more BWPs for a terminal by a network side (such as a base station) or agreed in a technical specification, to determine random access configuration information.

For the meaning of the random access configuration information, reference can be made to the descriptions of the foregoing embodiments. If it is configured by the network side, the network side transmits the random access configuration information to the terminal. In the embodiments of the present disclosure, a case where the network side configures the information and transmits it to the terminal is taken as an example in the figure.

Step 502 includes: when random access is triggered, the terminal initiating a random access procedure based on the random access configuration information.

First, according to the random access configuration information, the terminal obtains a random access resource corresponding to a currently activated BWP, and then uses the random access resource to initiate the random access procedure.

Specifically, in the process of the terminal initiating the random access, the manner in which the terminal initiates the random access includes one or any combination of the following manners:

(1) If the "random access resource" is used for a contention based random access procedure, the terminal uses the random access resource when initiating the contention based random access procedure.

(2) If the "random access resource" is used for a non-contention based random access procedure, the terminal uses the random access resource when initiating the non-contention based random access procedure.

(3) If the "random access resource" is on the default BWP, the terminal uses the random access resource on the default BWP when initiating the random access.

(4) If a BWP for initiating a contention based random access procedure is deactivated after the terminal initiates the contention based random access procedure on the BWP, the random access procedure is stopped.

(5) If a BWP for initiating a non-contention based random access procedure is deactivated after the terminal initiates the non-contention based random access procedure on the BWP, the random access procedure is stopped.

(6) If the terminal initiates a contention based random access procedure on a BWP, a subsequent message (such as msg2, msg3, msg4, or msg5) of the random access procedure is also sent on the BWP.

(7) If the terminal initiates a non-contention based random access procedure on a BWP, a subsequent message (such as msg2/3/4/5) of the random access procedure is also sent on the BWP.

(8) If the terminal initiates a contention based random access procedure on the default BWP, a subsequent message (such as msg2/3/4/5 in FIG. 2 and FIG. 3) of the random access procedure is also sent on the BWP.

(9) If the terminal initiates a non-contention based random access procedure on the default BWP, a subsequent message (such as msg2/3/4/5 in FIG. 2 and FIG. 3) of the random access procedure is also sent on the BWP.

In the above processes, if the BWP for the terminal to initiate the random access procedure is not the currently activated BWP, the behavior of the terminal includes one or any combination of the following: deactivating the currently activated BWP; activating the BWP corresponding to the initiation of the random access procedure; informing the network side of the activated BWP; or informing the network side of the deactivated BWP.

For specific implementation processes of the contention based random access procedure and the non-contention based random access procedure in the above processes, reference can be made to the processes shown in FIG. 2 and FIG. 3.

Figure 6:
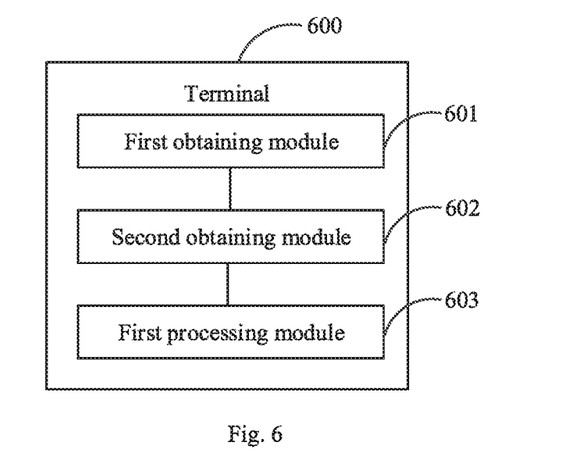
FIG. 6 is a first schematic structural diagram of a terminal according to embodiments of the present disclosure.

Referring to FIG. 6, FIG. 6 is a schematic structural diagram of a terminal provided by embodiments of the present disclosure. As shown in FIG. 6, the terminal 600 includes:

a first obtaining module 601, configured to obtain random access configuration information, where the random access configuration information includes a random access resource corresponding to each bandwidth part (BWP);

a second obtaining module 602, configured to obtain a target random access resource corresponding to a currently activated BWP for the terminal according to the random access configuration information; and a first processing module 603, configured to initiate a random access procedure by using the target random access resource.

For the content and meaning of the random access configuration information, reference may be made to the descriptions of the foregoing embodiments.

Optionally, when the indication information for indicating whether the random access resource is used for the contention based random access indicates that the random access resource is used for the contention based random access, the first processing module 601 is specifically configured to initiate a contention based random access procedure by using the target random access resource; when the indication information for indicating whether the random access resource is used for the non-contention based random access indicates that the random access resource is used for the non-contention based random access, the first processing module 601 is specifically configured to initiate a non-contention based random access procedure by using the target random access resource.

Optionally, when the BWP identity includes the identity of the default BWP, the first processing module 601 is specifically configured to initiate the random access procedure on the default BWP by using the target random access resource.

Figure 7:
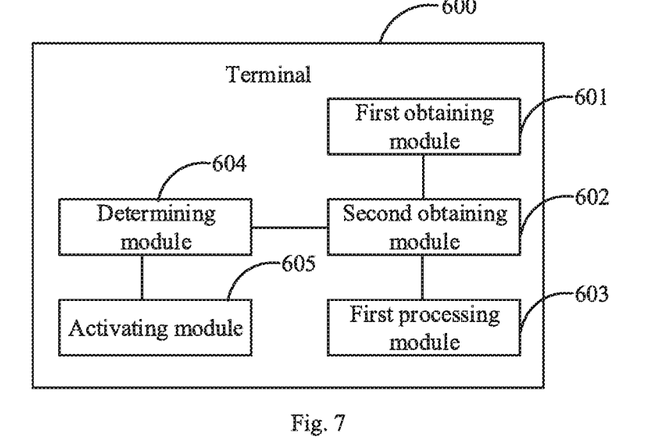
FIG. 7 is a second schematic structural diagram of a terminal according to embodiments of the present disclosure.

As shown in FIG. 7, the terminal further includes:

a determining module 604, configured to determine whether a currently activated BWP for the terminal is a BWP corresponding to the target random access resource; and an activating module 605, configured to activate, in a case that the currently activated BWP for the terminal is not the BWP corresponding to the target random access resource, the BWP corresponding to the target random access resource.

In this case, the first processing module 601 is specifically configured to initiate, by using the target random access resource, the random access procedure on the BWP corresponding to the target random access resource.

Figure 8:
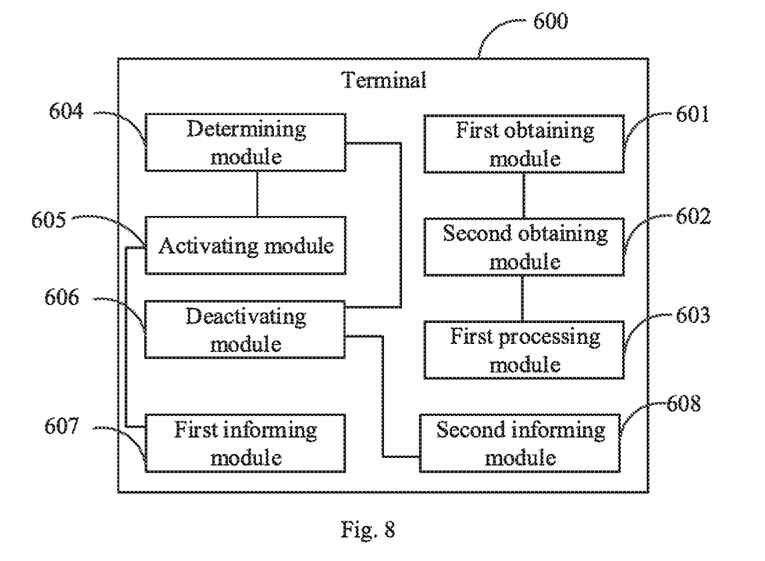
FIG. 8 is a third schematic structural diagram of a terminal according to embodiments of the present disclosure.

In order to further improve resource utilization, based on FIG. 7 and as shown in FIG. 8, the terminal further includes: a deactivating module 606, configured to deactivate the currently activated BWP; a first informing module 607, configured to inform a network side about information of the currently activated BWP for the terminal; and a second informing module 608, configured to inform the network side about information of the BWP corresponding to the target random access resource.

Figure 9:
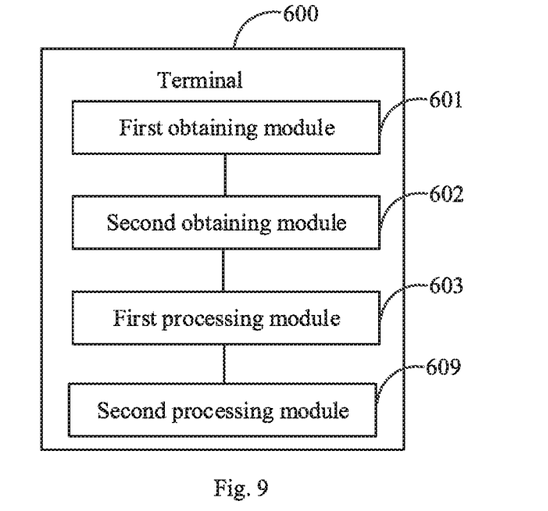
FIG. 9 is a fourth schematic structural diagram of a terminal according to embodiments of the present disclosure.

To further improve resource utilization, as shown in FIG. 9, the terminal may further include a second processing module 609, configured to stop the random access procedure in a case that the currently activated BWP for the terminal is deactivated. The type of the stopped random access procedure includes one or more of the following: a contention based random access procedure; or, a non-contention based random access procedure.

The terminal 600 may implement the various processes implemented by the terminal in the method embodiments of FIG. 1 to FIG. 5. To avoid repetition, details are not described herein.

In the embodiments of the present disclosure, when the terminal initiates the random access procedure, the target random access resource corresponding to the currently activated BWP can be obtained according to the random access configuration information, and the target random access resource is used to initiate the random access procedure. It can be seen that, in the embodiments of the present disclosure, it can be guaranteed that the terminal initiates the random access procedure by using the corresponding resource on the currently activated BWP, thereby avoiding the problem in the conventional technologies that a random access procedure failure is caused due to the fact that there may be no random access resource configured for an activated BWP on which a terminal operates. Therefore, based on the embodiments of the present disclosure, the success rate of communication between terminals and network sides can be improved.

Figure 10:
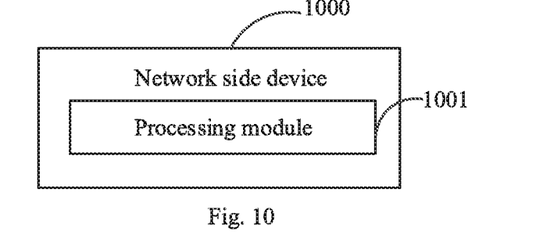
FIG. 10 is a first schematic structural diagram of a network side device according to embodiments of the present disclosure.

As shown in FIG. 10, a network side device 1000 according to embodiments of the present disclosure includes:

a processing module 1001, configured to complete a random access procedure of a terminal according to the random access procedure initiated by the terminal using a target random access resource.

The target random access resource is a target random access resource that is corresponding to a currently activated BWP for the terminal and obtained by the terminal based on random access configuration information, and the random access configuration information includes a random access resource corresponding to each bandwidth part (BWP).

Optionally, in a case that the terminal initiates a contention based random access procedure by using the target random access resource, the processing module 1001 is specifically configured to complete the contention based random access procedure of the terminal, according to the contention based random access procedure initiated by the terminal by using the target random access resource.

Optionally, in a case that the terminal initiates a non-contention based random access procedure by using the target random access resource, the processing module 1001 is specifically configured to complete the non-contention based random access procedure of the terminal, according to the non-contention based random access procedure initiated by the terminal by using the target random access resource.

Figure 11:
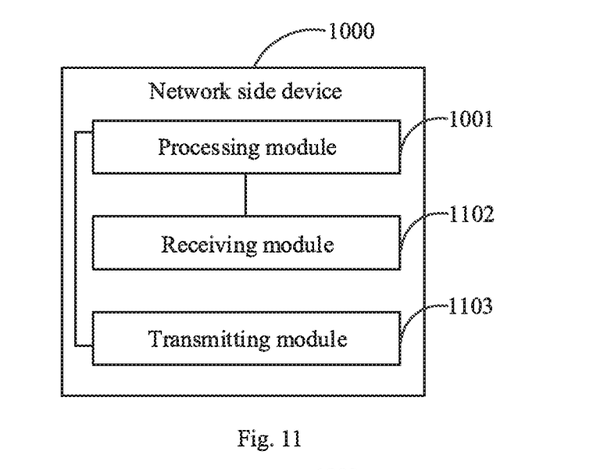
FIG. 11 is a second schematic structural diagram of a network side device according to embodiments of the present disclosure.

As shown in FIG. 11, to further improve resource utilization, the network side device may further include: a receiving module 1102, configured to receive, information of a BWP corresponding to the target random access resource, where the information of the BWP corresponding to the target random access resource is transmitted by the terminal in a case that the terminal determines that a currently activated BWP is not the BWP corresponding to the target random access resource; and/or, receive information of the currently activated BWP, where the information of the currently activated BWP is transmitted by the terminal in a case that the terminal determines that the currently activated BWP is not the BWP corresponding to the target random access resource. The network side device may further include a transmitting module 1103, configured to transmit the random access configuration information to the terminal.

The network side device 1000 may implement the various processes implemented by the network side in the method embodiments of FIG. 1 to FIG. 5. To avoid repetition, details are not described herein.

In the embodiments of the present disclosure, when the terminal initiates the random access procedure, the target random access resource corresponding to the currently activated BWP can be obtained according to the random access configuration information, and the target random access resource is used to initiate the random access procedure. It can be seen that, in the embodiments of the present disclosure, since it can be guaranteed that the terminal initiates the random access procedure based on the corresponding resource on the currently activated BWP, the problem in the conventional technologies that a random access procedure failure is caused due to the fact that there may be no random access resource configured for a activated BWP on which a terminal operates, is avoided. Therefore, based on the embodiments of the present disclosure, the success rate of communication among terminals and network sides can be improved.

Figure 12:
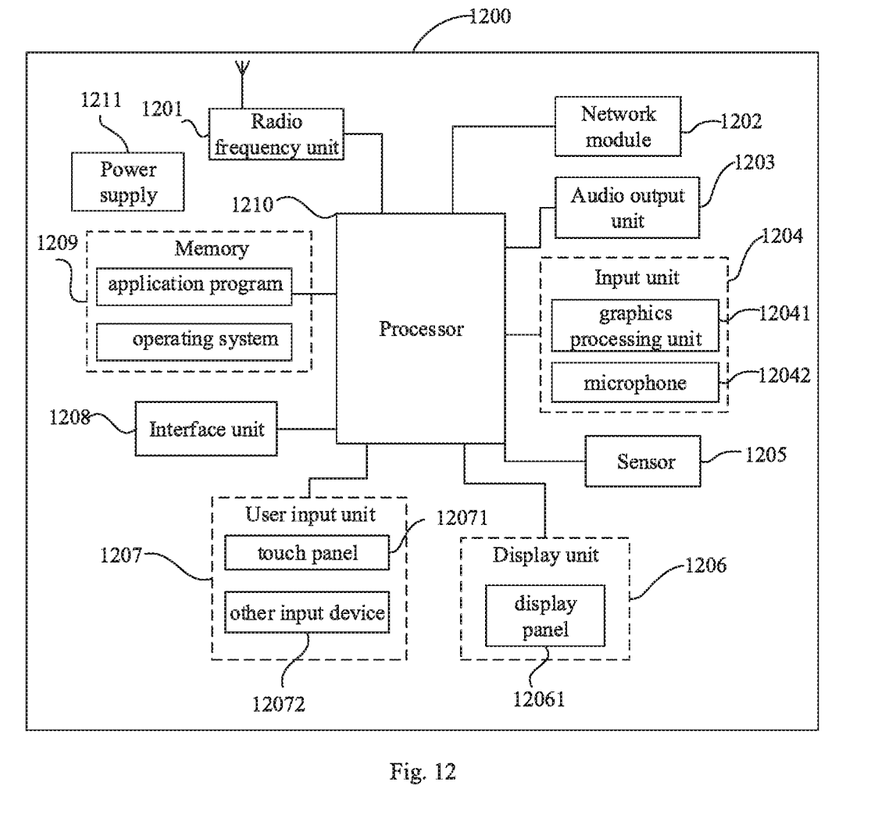
FIG. 12 is a schematic structural diagram of another terminal according to embodiments of the present disclosure.

FIG. 12 is a schematic diagram of a hardware structure of a terminal that implements the various embodiments of the present disclosure.

The terminal 1200 includes, but is not limited to, a radio frequency unit 1201, a network module 1202, an audio output unit 1203, an input unit 1204, a sensor 1205, a display unit 1206, a user input unit 1207, an interface unit 1208, a memory 1209, a processor 1210, and a power supply 1211, etc. Those skilled in the art can understand that the structure of the terminal shown in FIG. 12 does not constitute a limitation to the terminal, and the terminal may include more or fewer components than those shown in the figure, or have some components combined, or use a different arrangement of the components. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 1201 is configured to obtain random access configuration information, where the random access configuration information includes a random access resource corresponding to each bandwidth part (BWP).

The processor 1210 is configured to obtain a target random access resource corresponding to a currently activated BWP for the terminal based on the random access configuration information; and initiate a random access procedure by using the target random access resource.

For the content and meaning of the random access configuration information, reference may be made to the descriptions of the foregoing method embodiments.

When the indication information for indicating whether the random access resource is used for the contention based random access indicates that the random access resource is used for the contention based random access, the processor 1210 is configured to initiate a contention based random access procedure by using the target random access resource.

When the indication information for indicating whether the random access resource is used for the non-contention based random access indicates that the random access resource is used for the non-contention based random access, the processor 1210 is configured to initiate a non-contention based random access procedure by using the target random access resources.

When the BWP identity includes the identity of the default BWP, the processor 1210 is configured to initiate the random access procedure on the default BWP by using the target random access resource.

Optionally, the processor 1210 is configured to determine whether a currently activated BWP for the terminal is a BWP corresponding to the target random access resource; and activate, in a case that the currently activated BWP for the terminal is not the BWP corresponding to the target random access resource, the BWP corresponding to the target random access resource. The random access procedure is initiated on the BWP corresponding to the target random access resource by using the target random access resource.

Optionally, the processor 1210 is configured to deactivate the currently activated BWP for the terminal; inform a network side about information of the currently activated BWP for the terminal; and inform the network side about information of the BWP corresponding to the target random access resource.

Optionally, the processor 1210 is configured to stop the random access procedure in a case that the currently activated BWP for the terminal is deactivated.

Optionally, a type of the stopped random access procedure includes one or more of the following: a contention based random access procedure; or, a non-contention based random access procedure.

It should be understood that, in the embodiments of the present disclosure, the radio frequency unit 1201 may be configured to receive and send information, or to receive and send signals in a call. Specifically, the radio frequency unit 120 delivers the downlink information received from a base station to the processor 1210. Generally, the radio frequency unit 1201 includes, but is not limited to, an antenna, at least one amplifier, a transceiver, a coupler, a low noise amplifier, a duplexer, or the like. In addition, the radio frequency unit 1201 may communicate with a network or other devices via a wireless communication system.

The terminal provides users with wireless broadband Internet access via the network module 1202, such as helping users send and receive emails, browse web pages and access streaming media.

The audio output unit 1203 may convert audio data received by the radio frequency unit 1201 or the network module 1202 or stored in the memory 1209 into audio signals and output them as sound. Moreover, the audio output unit 1203 may provide audio output (for example, call signal reception sound, message reception sound, etc.) related to a specific function performed by the terminal 1200. The audio output unit 1203 includes a speaker, a buzzer, a receiver, or the like.

The input unit 1204 is configured to receive audio or video signals. The input unit 1204 may include a graphics processing unit (GPU) 12041 and a microphone 12042. The graphics processor 12041 is configured to process image data of still pictures or videos obtained via an image capture device (such as a camera) in an image capture mode or a video capture mode. The processed image frames may be displayed on the display unit 1206. The image frames processed by the graphics processor 12041 may be stored in the memory 1209 (or other storage medium) or transmitted via the radio frequency unit 1201 or the network module 1202. The microphone 12042 may receive sound, and may process the sound into audio data. The processed audio data may be converted into a format that can be transmitted to a mobile communication base station for outputting via the radio frequency unit 1201 in the case of a telephone call mode.

The terminal 1200 further includes at least one sensor 1205, such as an optical sensor, a motion sensor, or other sensors. Specifically, the optical sensor includes an ambient light sensor and a proximity sensor. The ambient light sensor may adjust brightness of the display panel 12061 according to the brightness of the ambient light, and the proximity sensor may close the display panel 12061 and/or backlight when the terminal 1200 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the terminal (such as switching of horizontal and vertical screen, a correlated game, magnetometer pose calibration), a function about vibration recognition (such as pedometer, tapping). The sensor 1205 may also include a fingerprint sensor, a pressure sensor, an iris sensor, a molecular sensor, a gyroscope, a barometer, a hygrometer, a thermometer, an infrared sensors, or the like, which are not described herein.

The display unit 1206 is configured to display information input by the user or information provided for the user. The display unit 1206 may include a display panel 12061. The display panel 12061 may be configured in the form of a liquid crystal display (LCD), an organic light-emitting diode (OLED), or the like.

The user input unit 1207 may be configured to receive inputted numeric or character information, and generate key signal inputs related to user settings and function control of the terminal. Specifically, the user input unit 1207 includes a touch panel 12071 and other input device 12072. The touch panel 12071, also known as a touch screen, may collect a touch operation of a user thereon or thereby (for example, an operation on or around the touch panel 12071 that is made by a user with a finger, a touch pen or any other suitable object or accessory). The touch panel 12071 may include two parts: a touch detection device and a touch controller.

The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 1210. The touch controller may receive a command from by the processor 1210 and executes the command. In addition, the touch panel 12071 may be implemented by various types such as a resistive panel, a capacitive panel, an infrared panel, or a surface acoustic wave panel. In addition to the touch panel 12071, the user input unit 1207 may include other input device 12072. Specifically, the other input device 12072 may include, but is not limited to, a physical keyboard, a function key (such as a volume control key, a switch key), a trackball, a mouse, or a joystick, which are not described herein.

Further, the display panel 12061 may be covered by the touch panel 12071. When the touch panel 12071 detects a touch operation on or near the touch panel 12071, the touch panel 12071 transmits the touch operation to the processor 1210 to determine the type of the touch event, and the processor 1210 provides a corresponding visual output on the display panel 12061 according to the type of touch event. Although the touch panel 12071 and the display panel 12061 are implemented as two independent components to implement the input and output functions of the terminal in FIG. 12, in some embodiments, the touch panel 12071 and the display panel 12061 may be integrated to implement the input and output functions of the terminal, which are not limited herein.

The interface unit 1208 is an interface through which an external device is connected to the terminal 1200. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 1208 may be configured to receive input (e.g., data information, power, etc.) from an external device and transmit the received input to one or more elements in the terminal 1200 or may be configured to transmit data between the terminal 1200 and the external device.

The memory 1209 may be configured to store software programs and various data. The memory 1209 may mainly include a program storage area and a data storage area, where the program storage area may store an operating system, an application program (such as a sound playback function, an image playback function, etc.) required for at least one function; the data storage area may store data (such as audio data, a phone book, etc.) created according to the use of the mobile phone. In addition, the memory 1209 may include a high-speed random access memory, and may further include a non-volatile memory, such as at least one magnetic disk storage device, a flash memory device, or other volatile solid-state storage device.

The processor 1210 is a control center of the terminal, which uses various interfaces and lines to connect various parts of the entire terminal. The processor 1210 runs or executes software programs and/or modules stored in the memory 1209 and calls data stored in the memory 1209, to execute various functions of the terminal and process data, so as to monitor the terminal as a whole. The processor 1210 may include one or more processing units. Optionally, the processor 1210 may integrate an application processor and a modem processor. The application processor mainly processes an operating system, a user interface, an application program, etc., and the modem processor mainly processes wireless communications. It can be understood that the foregoing modem processor may not be integrated into the processor 1210.

The terminal 1200 may further include a power supply 1211 (such as a battery) for supplying power to various components. Optionally, the power supply 1211 may be logically connected to the processor 1210 through a power management system, so as to implement functions, such as management of charging and discharging, and power consumption management, via the power management system.

In addition, the terminal 1200 may include some functional modules that are not shown, which are not described herein again.

Optionally, embodiments of the present disclosure further provide a terminal, including a processor, a memory, and a computer program stored on the memory and executable by the processor. When the computer program is executed by the processor, the various processes of the method embodiments for random access are implemented, which can achieve the same technical effects. To avoid repetition, details are not described herein.

Embodiments of the present disclosure further provide a computer readable storage medium. A computer program is stored on the computer readable storage medium. When the computer program is executed by a processor, the various processes of the method embodiments for random access are implemented, which can achieve the same technical effects. To avoid repetition, details are not described herein. The computer readable storage medium is, for example, a read-only memory (ROM), a random access memory (RAM), a magnetic disk or an optical disk.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the conventional technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described in the above with reference to the accompanying drawings, and the present disclosure is not limited to the specific implementations described above. The specific implementations described above are merely schematic and are not restrictive. Those skilled in the art at the inspiration of the present disclosure can obtain many forms without departing from the spirit of the present disclosure and the protection scope of the claims, which all fall within the protection of the present disclosure.

What is claimed is:

1. A method for random access, applied to a terminal, comprising:
   obtaining random access configuration information, wherein the random access configuration information comprises a random access resource corresponding to each bandwidth part (BWP);
   obtaining a target random access resource corresponding to a BWP for the terminal based on the random access configuration information; and
   initiating a random access procedure by using the target random access resource,
   wherein the initiating the random access procedure by using the target random access resource comprises:
   activating, in a case that the target random access resource is not on a currently activated BWP for the terminal, the BWP where the target random access resource is located; and initiating, on the BWP where the target random access resource is located, the random access procedure by using the target random access resource.

2. The method according to claim 1, wherein the random access configuration information further comprises one or more pieces of following information:
   indication information for indicating whether the random access resource is used for a contention based random access;
   indication information for indicating whether the random access resource is used for a non-contention based random access; or
   a bandwidth for the random access procedure.

3. The method according to claim 2, wherein in a case that the indication information for indicating whether the random access resource is used for the contention based random access indicates that the random access resource is used for the contention based random access, the initiating the random access procedure by using the target random access resource comprises: initiating a contention based random access procedure by using the target random access resource; and
   wherein in a case that the indication information for indicating whether the random access resource is used for the non-contention based random access indicates that the random access resource is used for the non-contention based random access, the initiating the random access procedure by using the target random access resource comprises: initiating a non-contention based random access procedure by using the target random access resource, or
   wherein the bandwidth for the random access procedure is applied in a process in which the terminal transmits a message to the network side in the random access procedure, and/or a process in which the terminal receives a message from the network side in the random access procedure.

4. The method according to claim 1, wherein the random access resource comprises one or more of: time-domain resource configuration; frequency-domain resource configuration; coding resource configuration; or, space resource configuration.

5. The method according to claim 4, wherein the random access resources of different BWPs are overlapped, or are not overlapped, or are partially overlapped; or
   wherein the time-domain resource configuration comprises one or more of: a radio frame; a subframe; or, a slot; or
   wherein the coding resource configuration comprises: a random access preamble; or
   wherein the space resource configuration comprises one or more of: a reference signal identity; a synchronous signal block identity; a channel state information-reference signal (CSI-RS) identity; a beam identity; a beam pair identity; a transmission node identity; a cell identity; or, a cell group identity.

6. The method according to claim 4, wherein the frequency-domain resource configuration comprises one or more of: a frequency point identity; a bandwidth; a BWP identity; a physical resource block identity; a cell identity; or, a subcarrier spacing.

7. The method according to claim 6, wherein the BWP identity comprises one or more of: an identity of a default BWP; an identity of the currently activated BWP, or, an identity of a currently deactivated BWP.

8. The method according to claim 1, further comprising:
   stopping the random access procedure in a case that the currently activated BWP for the terminal is deactivated,
   wherein a type of the stopped random access procedure comprises one or more of: a contention based random access procedure; or, a non-contention based random access procedure.

9. The method according to claim 1, further comprising: deactivating the currently activated BWP for the terminal.

10. A terminal, comprising: a memory, a processor, and a program stored in the memory and executable by the processor, wherein the program is executed by the processor to:
    obtain random access configuration information, wherein the random access configuration information comprises a random access resource corresponding to each bandwidth part (BWP);
    obtain a target random access resource corresponding to a BWP for the terminal based on the random access configuration information; and
    initiate a random access procedure by using the target random access resource,
    wherein when initiating the random access procedure by using the target random access resource, the processor is further configured to:
    activate, in a case that the target random access resource is not on a currently activated BWP for the terminal, the BWP where the target random access resource is located: and initiate, on the BWP where the target random access resource is located, the random access procedure by using the target random access resource.

11. The terminal according to claim 10, wherein the processor is further configured to:
    deactivate the currently activated BWP for the terminal.

12. The terminal according to claim 10, wherein the random access configuration information further comprises one or more pieces of following information:
    indication information for indicating whether the random access resource is used for a contention based random access;
    indication information for indicating whether the random access resource is used for a non-contention based random access; or
    a bandwidth for the random access procedure.

13. The terminal according to claim 12, wherein in a case that the indication information for indicating whether the random access resource is used for the contention based random access indicates that the random access resource is used for the contention based random access, the initiating the random access procedure by using the target random access resource comprises: initiating a contention based random access procedure by using the target random access resource; and
- wherein in a case that the indication information for indicating whether the random access resource is used for the non-contention based random access indicates that the random access resource is used for the non-contention based random access, the initiating the random access procedure by using the target random access resource comprises: initiating a non-contention based random access procedure by using the target random access resource, or
- wherein the bandwidth for the random access procedure is applied in a process in which the terminal transmits a message to the network side in the random access procedure, and/or a process in which the terminal receives a message from the network side in the random access procedure.

14. The terminal according to claim 10, wherein the random access resource comprises one or more of: time-domain resource configuration; frequency-domain resource configuration; coding resource configuration; or, space resource configuration.

15. The terminal according to claim 14, wherein the random access resources of different BWPs are overlapped, or are not overlapped, or are partially overlapped; or
- wherein the time-domain resource configuration comprises one or more of: a radio frame; a subframe; or, a slot; or
- wherein the coding resource configuration comprises: a random access preamble; or
- wherein the space resource configuration comprises one or more of: a reference signal identity; a synchronous signal block identity; a channel state information-reference signal (CSI-RS) identity; a beam identity; a beam pair identity; a transmission node identity; a cell identity; or, a cell group identity.

16. The terminal according to claim 14, wherein the frequency-domain resource configuration comprises one or more of: a frequency point identity; a bandwidth; a BWP identity; a physical resource block identity; a cell identity; or, a subcarrier spacing.

17. The terminal according to claim 16, wherein the BWP identity comprises one or more of: an identity of a default BWP; an identity of the currently activated BWP; or, an identity of a currently deactivated BWP.

18. The terminal according to claim 10, wherein the processor is further configured to:
- stop the random access procedure in a case that the currently activated BWP for the terminal is deactivated, wherein a type of the stopped random access procedure comprises one or more of: a contention based random access procedure; or, a non-contention based random access procedure.

19. A non-transitory computer-readable storage medium, having a program stored thereon, wherein the program, when executed by a processor, causes the processor to perform following steps:
- obtaining random access configuration information, wherein the random access configuration information comprises a random access resource corresponding to each bandwidth part (BWP);
- obtaining a target random access resource corresponding to a BWP for the terminal based on the random access configuration information; and
- initiating a random access procedure by using the target random access resource,
- wherein the initiating the random access procedure by using the target random access resource comprises:
- activating, in a case that the target random access resource is not on a currently activated BWP for the terminal, the BWP where the target random access resource is located; and initiating, on the BWP where the target random access resource is located, the random access procedure by using the target random access resource.

20. The non-transitory computer-readable storage medium according to claim 19, wherein the program, when executed by a processor, causes the processor to further perform following steps:
- deactivating the currently activated BWP for the terminal.

* * * * *